United States Patent
Yi et al.

(10) Patent No.: US 8,447,747 B1
(45) Date of Patent: May 21, 2013

(54) SYSTEM FOR GENERATING BEHAVIOR-BASED ASSOCIATIONS FOR MULTIPLE DOMAIN-SPECIFIC APPLICATIONS

(75) Inventors: Jin Y. Yi, Seattle, WA (US); Dany Miguel Yannick Houde, Seattle, WA (US); Douglas Tak-Lai Wong, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 315 days.

(21) Appl. No.: 12/882,112

(22) Filed: Sep. 14, 2010

(51) Int. Cl.
*G06F 7/00* (2006.01)
*G06F 17/30* (2006.01)

(52) U.S. Cl.
USPC ............ 707/705; 707/722; 707/727; 707/728

(58) Field of Classification Search
USPC .................... 707/705, 722, 728, 999.1, 999.3
See application file for complete search history.

(56) References Cited

U.S. PATENT DOCUMENTS

| | | | |
|---|---|---|---|
| 7,343,365 B2 * | 3/2008 | Farnham et al. | 715/853 |
| 7,412,442 B1 | 8/2008 | Vadon et al. | |
| 7,424,486 B2 | 9/2008 | Whitman et al. | |
| 7,668,821 B1 | 2/2010 | Donsbach et al. | |
| 7,716,217 B2 * | 5/2010 | Marston et al. | 707/728 |
| 7,953,740 B1 | 5/2011 | Vadon et al. | |
| 8,200,661 B1 * | 6/2012 | Pearce et al. | 707/721 |
| 2002/0019763 A1 | 2/2002 | Linden et al. | |
| 2005/0071251 A1 | 3/2005 | Linden et al. | |
| 2005/0222987 A1 * | 10/2005 | Vadon | 707/3 |
| 2007/0130145 A1 * | 6/2007 | Pedersen et al. | 707/9 |
| 2008/0004989 A1 | 1/2008 | Yi | |
| 2008/0040239 A1 * | 2/2008 | Jacobi et al. | 705/27 |
| 2009/0182642 A1 * | 7/2009 | Sundaresan | 705/26 |
| 2009/0265430 A1 * | 10/2009 | Bechtel et al. | 709/205 |
| 2011/0208585 A1 * | 8/2011 | Daboll et al. | 705/14.53 |
| 2011/0225170 A1 * | 9/2011 | Obasanjo et al. | 707/748 |

* cited by examiner

*Primary Examiner* — Hares Jami
(74) *Attorney, Agent, or Firm* — Knobbe Martens Olson & Bear LLP

(57) ABSTRACT

Systems and processes are described for generating a generic relationship dataset that can be adapted for use by multiple domain-specific applications. Such applications can include recommendation applications, search applications, optimization applications, and/or other applications. These systems and processes can analyze some or all actions of users with respect to a network application, such as a web application. Data representing user actions occurring in a time window can be paired together in the relationship dataset, together with one or more metrics related to the user actions. These metrics can represent general measurements that in certain embodiments are not customized for an individual application. As a result, separate domain-specific applications can independently analyze the relationship data according to different criteria without maintaining separate sets of the relationship data.

6 Claims, 6 Drawing Sheets

| Action X | Action Y | Co-view Count | Time Delta |
|---|---|---|---|
| Search for "ipod" | View iPod Shuffle Browser Page | 234 | 23,546 |
| Search for "ipod" | View iPod shuffle 2Gb Black Detail Page | 32 | 7,434 |
| View Sony TV Detail Page | View Samsung TV Detail Page | 68 | 12,334 |
| View iPod Shuffle Browser Page | View iPod shuffle 2Gb Black Detail Page | 1 | 65,467 |
| ... | ... | | |

FIG. 5

SYSTEM FOR GENERATING BEHAVIOR-BASED ASSOCIATIONS FOR MULTIPLE DOMAIN-SPECIFIC APPLICATIONS

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

Similarly, to improve the relevance of the query results presented to users, some search engine systems monitor and analyze the search-related behaviors of users to detect and quantify associations between particular search strings and items. For example, in the context of a product catalog, if a relatively large percentage of the users who submit the search string "Apple" select an Apple iPod™ from the corresponding search results pages, the search engine system may create an association between this search string and product. As another example, in the context of a search engine for searching web documents, if a relatively large percentage of those who search for "tax return" select the web site "www.irs.gov," an association may be created between this search string and an identifier of the web site.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIG. 5 illustrates an embodiment of data output from an example relationship dataset.

DETAILED DESCRIPTION

I. Introduction

As described above, user browsing and purchasing history can be analyzed to detect product-to-product associations and keyword-to-product associations, among other types of associations. Product associations have been used primarily to recommend items to users, while keyword-to-product associations have been used primarily to improve search engine results. Despite their different objectives, the underlying data consumed by recommendation and search applications can have significant overlap. Generating separate datasets for recommendations and search can therefore result in a significant duplication of data and effort. As new applications and uses for behavioral data develop, it can also be expensive for developers to build similar datasets for these new applications.

An obstacle to a search engine using the behavioral data generated for a recommendation engine and vice versa is that the behavioral data is typically scored and ranked according to the design of the recommendation engine (or search engine). The recommendation engine's scoring and rankings may not be relevant or optimal for the search engine. If either engine used the other's behavioral dataset, erroneous or sub-optimal results might be generated, resulting in potential confusion or disinterest from users.

This disclosure describes embodiments of systems and processes that generate a generic relationship dataset that can be adapted for use by multiple domain-specific applications. Such applications can include recommendation applications, search applications, optimization applications, and/or other applications. These systems and processes can analyze some or all actions of users with respect to a network application, such as a web application. Data representing user actions occurring in a time window can be paired together in the relationship dataset, together with one or more metrics related to the user actions. These metrics can represent general measurements that in certain embodiments are not customized for an individual application. As a result, in certain embodiments, separate domain-specific applications can independently analyze the relationship data according to different criteria without maintaining separate sets of the relationship data.

Figure 1:
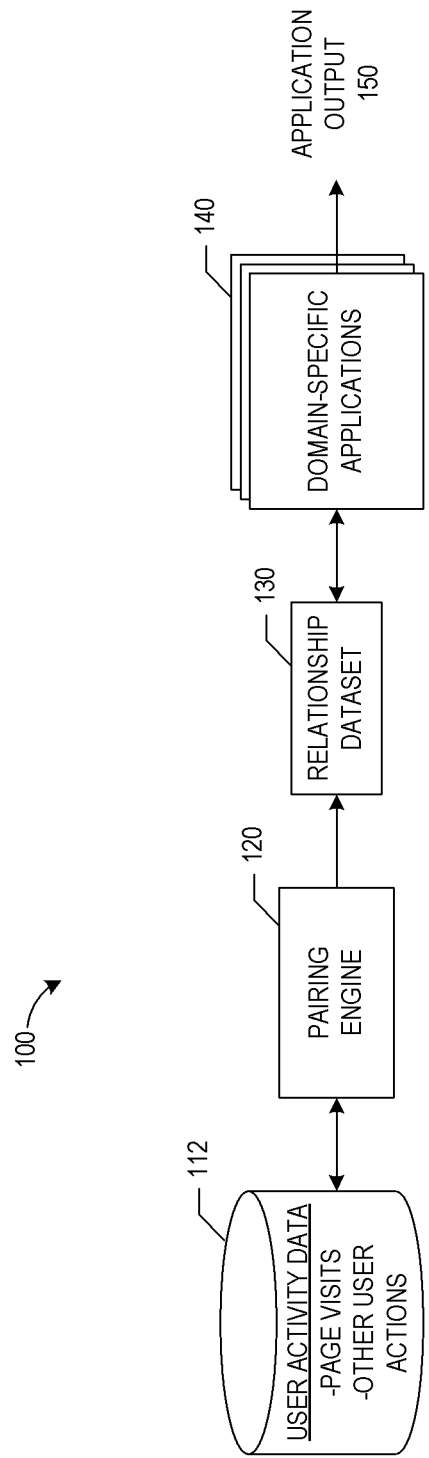
FIG. 1 illustrates an embodiment of a system for analyzing relationships between user actions with respect to a network application.
Figure 2:
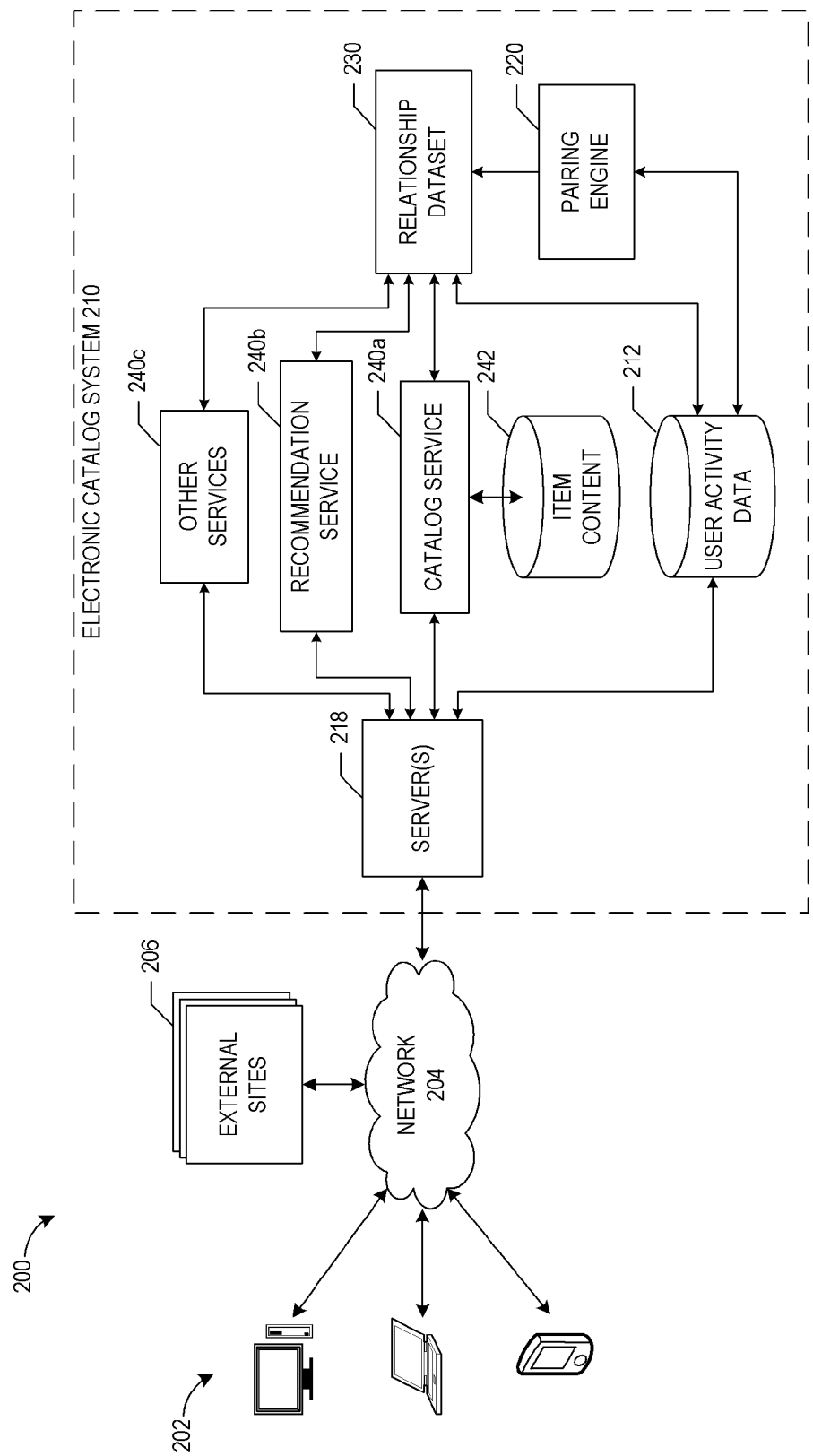
FIG. 2 illustrates an embodiment of a network environment for providing users with access to an electronic catalog system that can incorporate the relationship dataset building and usage features described herein.
Figure 3:
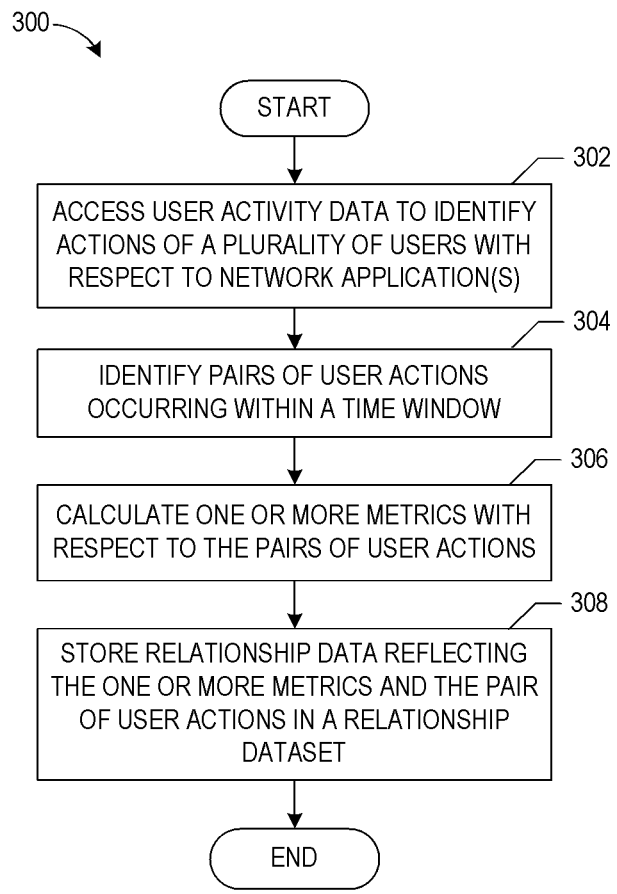
FIG. 3 illustrates an embodiment of a relationship mining process for detecting user action pairings and associated metrics.
Figure 4:
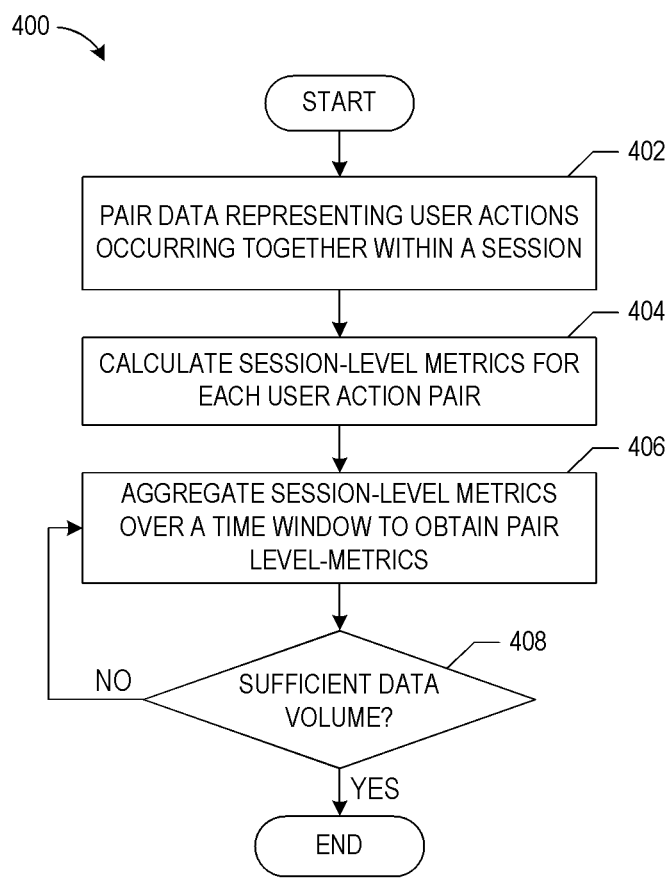
FIG. 4 illustrates another embodiment of a relationship mining process.
Figure 6:
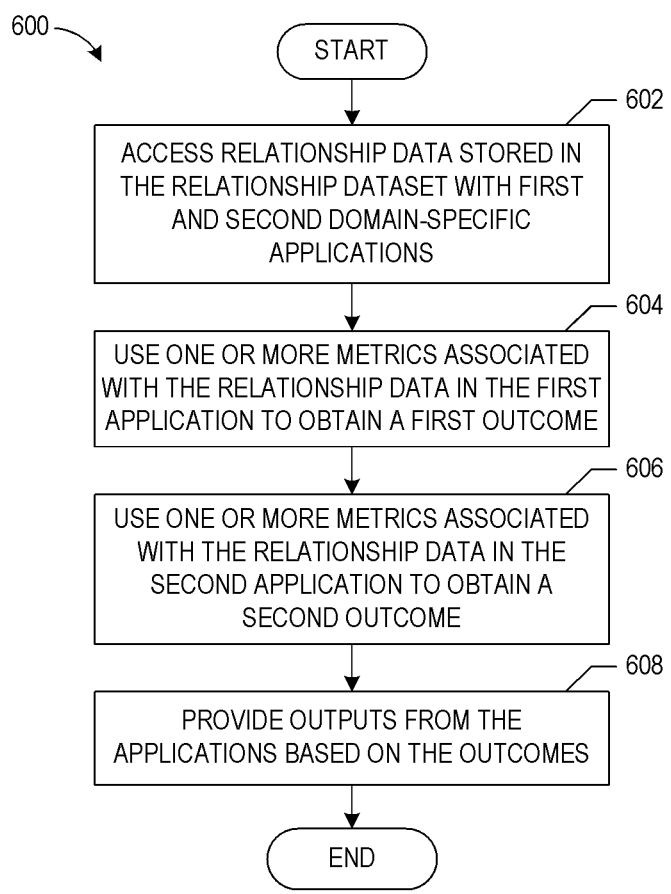
FIG. 6 illustrates an embodiment of a domain-specific application process that uses the relationship dataset generated above.

By way of overview, FIG. 1 provides a general introduction to relationship dataset building and analysis. FIG. 2 illustrates example relationship dataset features in the context of an electronic catalog system. FIGS. 3 through 5 illustrate more detailed example techniques for relationship dataset building, while FIG. 6 illustrates example application techniques for using the relationship data.

II. Example Relationship Mining Systems

FIG. 1 illustrates an embodiment of a relationship analysis system 100. The relationship analysis system 100 depicts several components that can be implemented in hardware and/or software. The relationship analysis system 100 presents a general overview of relationship dataset building. A more detailed system depicting relationship building and analysis in the context of an electronic catalog system is described below with respect to FIG. 2.

The relationship analysis system 100 includes a pairing engine 120 that accesses user activity data stored in a user data repository 112. Using this data, the pairing engine 120 creates a relationship dataset 130. At a high level, the relationship dataset 130 can include any collection of data representing relationships or associations between user actions and optionally measurements related to those user actions. Various domain-specific applications 140 can access the relationship dataset 130 to perform desired functions, producing application-specific output 150. Advantageously, in certain embodiments, the relationship dataset 130 is designed to be flexible and usable by multiple different applications 140 for different purposes.

The relationship analysis system 100 can be implemented as part of an interactive network application or a standalone (non-networked) application. Users of the network application can perform a variety of actions, which can include selecting documents or other items (e.g., via hyperlinks) and data entry (including entering search text), to name a few. This user activity data can be captured by the network (or other) application and stored in the user data repository 112.

The pairing engine 120 can mine the user activity data to detect behavioral relationships for storage in the relationship dataset 130. This behavioral data mining can include determining which user actions represented in the user activity data should be related to one another and optionally what measurements correspond to the user actions. However, the pairing engine 120 can detect relationships without performing measurements in some cases and, conversely, can perform measurements without detecting relationships. For instance, in one embodiment the pairing engine 120 computes a measurement associated with a single user action instead of a pair of related user actions. Further, the pairing engine 120 can relate more than two user actions together in some implementations.

Some examples of metrics measurable by the pairing engine 120 include measurements related to a quantity of user actions performed, a quantity of time taken to perform one or more user actions, and averages or other statistical measurements of the same. To illustrate, if the user actions include user selection of hypertext links, the pairing engine 120 might measure the number of users who selected certain links, a quantity of time between the selection of two links by the same user, and so forth. The pairing engine 120 can aggregate these and other metrics over a variety of users, for example, by totaling the number of users who selected two links while averaging the time difference between link selection for those users. Additional examples of metrics are described in greater detail below.

Advantageously, in certain embodiments, the pairing engine 120 computes one or more metrics that are not customized or specialized for a particular domain-specific application 140. These metrics can include measured values that do not include scores or rankings that represent the strength of relationships between user actions or other qualities of the user actions. Instead, in making the measurements, the pairing engine 120 can attempt to avoid making any quantitative (or qualitative) judgments about the user actions, leaving such analysis to the domain-specific applications 140. However, in some implementations, the pairing engine 130 may compute at least some scoring or ranking, such as a scoring or ranking that is relevant to a plurality of the domain-specific applications 140.

The domain-specific applications 140 can analyze the metrics and/or relationships of the relationship dataset 130 in a variety of ways. For instance, the applications 140 can compute a scoring based on one or more of the metrics, such as a combination of the metrics. This scoring can be derived using a mathematical function, an objective or optimizing function, a set of process steps, or the like. The mathematical function can manipulate the values of the metrics arithmetically and/or algebraically, for example, to produce a set of values that represent a value judgment on the user actions based on some selected criteria. A simple example of such a function can include a weighting applied to the measurements that assigns relative levels of importance to the relationships in the dataset 130. The domain-specific applications 140 can store any results of these functions in the relationship dataset 130 or in a separate dataset. More specific and detailed examples of application 140 functions are discussed below.

Because the pairing engine 120 generates a generic relationship dataset 130 flexible enough to be used by a plurality of applications 140, less data can be stored for the applications 140. Consequently, the relationship analysis system 100 can reduce the storage burden of storing multiple datasets in a computer system. In addition, with a single dataset 130, application development can be streamlined, saving developers time. Moreover, for new applications 140 developed after the development of the pairing engine 120, the pairing engine 120 can be reconfigured to gather new metrics as desired. The new metrics can advantageously be stored in the relationship dataset 130 without disrupting the functionality of the existing applications 140. It will be apparent from this disclosure that many other benefits can result from the operation of certain implementations of the relationship analysis system 100.

FIG. 2 illustrates an embodiment of a network environment 200 for providing users with access to an electronic catalog system 210 such as may be implemented for an e-commerce web site. For ease of illustration, the remainder of this disclosure will refer to relationship analysis features in the context of the electronic catalog system 210. It should be apparent, however, that the relationship analysis features can also be used in other types of systems and need not be implemented as part of, or in conjunction with, a web site.

Components of the relationship analysis system 100 of FIG. 1 illustrated in the electronic catalog system 210 include a user data repository 212, a pairing engine 220, a relationship dataset 230, and example domain-specific applications 240. These components can have all their respective features described above, as well as additional features that will be described below.

To provide context for the operation of the relationship analysis features in the electronic catalog system 210, the functionality of the other components shown in the network environment 200 will now be described. In the network environment 200, users can access the electronic catalog system 210 with user systems 202, which are computing devices. Examples of such computing devices can include desktop computers, laptop computers, tablets, personal digital assistants (PDAs), mobile phones, electronic book readers, other wireless handheld devices, set-top or other television boxes, media players, game consoles, and kiosks, among others. The user systems 202 access the electronic catalog system 210 over a network 204, which can be a local area network or a wide area network (including the Internet).

The electronic catalog system 210 can be implemented with one or more physical servers or computing machines. These machines can be geographically separate or co-located. Thus, each of the components depicted in the electronic catalog system 210 can include hardware and/or software for performing various features. The electronic catalog system 210 includes one or more servers 218 for receiving and responding to network requests from user systems 202. The one or more servers 218 can include web servers, application servers, database servers, combinations of the same, or the like.

One of the domain-specific applications 240 included in the electronic catalog system 210 is a catalog service 240*a*, which is in communication with the one or more servers 218. Users can query a search engine provided by the catalog service 240*a* via the servers 218 to obtain information about electronic catalog content stored in an item data repository 242. The electronic catalog content can include information about items (such as products and services) as well as pages with customer reviews, author pages, user-generated list pages, forum pages, blog pages, and the like. In one embodiment, at least some of this content is arranged in a hierarchical structure, having items associated with one or more categories or browse nodes in a hierarchy. The electronic catalog system 210 can provide functionality for users to browse pages in the item hierarchy in addition to searching the catalog. Users can select an item represented in the hierarchy or in a list of search results to view more details about an item.

In response to a user item selection, the server 218 can provide a catalog page (sometimes called an item detail page) that includes details about the selected item. The user system 202 can render the catalog page using a software program installed on the user system 202, such as a web browser. The user can also select an item to purchase an item. The servers 218 can store data regarding user activity with respect to the catalog service 240*a* or other components of the electronic catalog system 210 in one or more logs in the user data repository 212. This user activity data can include data regarding user item selections, including item viewing and purchase events. This user activity data can more generally include data representing any user action, including text entered by users in the search engine, links accessed by users, and so forth.

The catalog service 240*a* is an example of a domain-specific application 240 that can benefit from the relationship dataset 230 generated by the pairing engine 220. For example, the catalog service 240*a* can use the relationship dataset 230 to improve or optimize search engine results (see also FIG. 6). The relationship dataset 230 used by the catalog service 240*a* can include data reflecting behavioral associations or pairings between catalog items, user selections of catalog items (e.g., pages representing those items), search text, and so forth.

For instance, the relationship dataset 230 can include pairings between user-submitted keywords (or related search referrer pages) and page links or items selected by users after entering the keywords. Similar keyword-to-page associations are described in greater detail in U.S. application Ser. No. 11/276,079 ("the '079 application"), filed Feb. 13, 2006, titled "Detection of Behavior-Based Associations Between Search Strings and Items," the disclosure of which is hereby incorporated by reference in its entirety. The relationship dataset 230 can also include pairings between keywords, so as to suggest other search phrases to users. Such keyword-to-keyword associations are described in U.S. Pat. No. 7,424,486 ("the '486 patent"), filed Jun. 22, 2004, titled "Selection of Search Phrases to Suggest to Users in View of Actions Performed by Prior Users," the disclosure of which is hereby incorporated by reference in its entirety. The pairing engine 220 can implement some or all of the behavioral analysis features described in the '079 application and/or the '486 patent. In addition, the pairing engine 220 can expand on or alter those features as described herein.

The pairing engine 220 can provide different functionality for the catalog service 240*a* by compiling general metrics instead of specific association scores or the like. The pairing engine 220 can obtain these metrics, as well as information on item pairings, from logs in the user data repository 212. When generating the relationship dataset 230, the pairing engine 220 can generate metrics that indicate or reflect relatedness between items or user actions. However, instead of scoring these relationships, the pairing engine 220 can generate raw or pure metrics that are not customized for the catalog service 240*a* or any other application 240. For example, the pairing engine 220 can tabulate a number of times that users entered a specific keyword and then selected a specific page of the catalog. From this, the catalog service 240*a* can then assign a score or otherwise infer the strength of the association between the keyword and the catalog page.

The recommendation service 240*b* is illustrated as another example of a domain-specific application 240 that can use the relationship dataset 230. The recommendation service 250 can generate recommendations for users using any of a variety of algorithms, including behavior-based algorithms. Some examples of such algorithms are disclosed in U.S. Pat. No. 6,912,505, U.S. Pat. No. 6,691,163, and U.S. Pat. Pub. 2002/0198882, referred to above, the disclosures of which are hereby incorporated by reference in their entirety. Accordingly, the recommendation service 240*b* can use the behavioral data in the relationship dataset 130 in a variety of different ways. These recommendations can be displayed on a dedicated recommendations display page, on an item detail page, in an email or text message, or in a variety of other locations.

If the pairing engine 220 detects relationships between items selected by users, the recommendation service 240*b* can use this data to recommend items that are similar to items that a particular user has selected. Metrics that the pairing engine 220 might generate that can be useful for such recommendations can include a co-occurrence count reflecting a number of users that selected two items, the average time between such selections, and the like. The recommendation service 240*b* can separately rank the item-to-item relationships based on the computed numbers and/or average times.

This same item-to-item relationship data and associated metrics can also be used by the catalog service 240*a*. For example, the catalog service 240*a* can adjust search results to include items that do not have the same keywords used in a search query but that are nonetheless related to other items in the search results based on the behavioral data. Similarly, the recommendation service 240*b* can use keyword-to-item relationships to supplement recommendations of users that have entered similar search queries to other users. The flexibility of the relationship dataset 230 can facilitate this cross-pollination of the data among the two applications 240*a*, 240*b*. Other services 240*c* can also be added to take advantage of the data in the relationship dataset 230.

It should be noted that in some implementations, pairing engine 220 at least partially customizes the metrics for a class or set of applications, such as search and recommendation applications. For instance, the particular metrics tabulated by the pairing engine 220 can be useful to the specified class of applications without being specifically customized for each application in the class.

Further, the pairing engine 220 can generate metrics based on user activity data external to the electronic catalog system 210 in addition to or in place of user activity data within the electronic catalog system 210. Users accessing external sites 206, for instance, might select links (e.g., from a search engine) that refer to pages in the electronic catalog system 210. The pairing engine 220 can obtain these links and any associated search queries from the HTTP referrer associated with these page requests. Other potential sources of user activity data include toolbars installed in user browsers that report data to the electronic catalog system 210, applications on mobile devices, plug-ins, applications on social networking or other sites, and desktop widgets, among others.

The processing of the various components of the electronic catalog system 210 can be distributed across multiple machines, networks, and other computing resources. Some or all of the components of the electronic catalog system 210 can also be implemented in virtual machines, rather than in dedicated servers. Likewise, the data repositories shown can represent physical and/or logical data storage, including, for example, storage area networks, network attached storage, or other shared disk storage systems. Moreover, the connections between the components shown can represent possible paths of data flow, rather than actual connections between hardware. While some example connections are shown, any subset of the illustrated components can communicate with any other subset of components. For example, the recommendation service 240b can access item content stored in the item data repository 242 to obtain information about items to recommend to users.

III. Example Relationship Mining Processes

FIG. 3 illustrates an embodiment of a relationship mining process 300 for detecting user action pairings and associated metrics. The process 300 can be implemented by any of the systems described herein, including the system 100 and 200. For example, the process 300 can be implemented by the pairing engine 120 or 220.

At block 302, user activity data is accessed to identify actions of a plurality of users with respect to one or more network (or other) applications. In one embodiment, the user activity data can be accessed from one or more logs generated by a server, such as a web server. The user activity data can include the text of uniform resource locators (URLs) or other links accessed by users to pages or parts of pages (e.g., via HTML anchor tags). The links need not be limited to web browser links, but may instead or also include links in other applications and domains, such as XML links, word processor links, and other types of document links. The user activity data can also include search queries or other text generated by users, including forum posts, item reviews, blog posts, microblog posts (such as tweets), and the like. The text of search queries can also be obtained from URLs, or the URLs representing such search queries can be identified and used to represent the search queries in the relationship dataset.

Pairs of user actions occurring within a time window are identified at block 304. This identification can include assembling the user activity data for each user into a time-ordered series. This series, which can be considered a "click stream" or "input stream," can include user actions or events ordered by time stamps. However, the user activity data need not be sorted in time order in certain embodiments, while still including time stamps associated with user actions.

The window of time used to identify the user actions can be of any length or size, including on the order of one or more seconds, minutes, hours, days, weeks, months, or years. In one embodiment, the time window corresponds to a user's browsing session. The browsing session can include a single day, for example, or can be determined based on actual user application access times.

Identifying the pairs of user actions can include generating a graph of the user actions. For ease of illustration, the remainder of this application will refer to generating a graph of user actions, although other data types may be used, such as associative arrays or maps. The graph, being an abstract data type, can be implemented in any suitable data structure or structures, examples of which include adjacency lists or matrices, arrays, tables (including hash tables), binary trees including variants (such as heaps and B-trees), combinations of the same, and the like. The graph can also be stored in a flat file for simplicity.

Nodes in the graph can represent user actions. The edges between nodes in the graph can be directed or undirected. Generating a directed graph can provide benefits for a certain class of applications, while an undirected graph can be beneficial for others. The following disclosure illustrates examples related to directed graphs for illustrative purposes, but these examples can be extended to the undirected case in other implementations.

A directed graph can be constructed for the relationship dataset in one embodiment by identifying time-ordered pairs (or higher-order n-tuples) from a user's input stream. In the e-commerce context, it can be useful for this time ordering to be a left-to-right ordering representing before-and-after events. For example, if a user performed action A followed by action B and then C, the pairing engine can identify the pairings A→B, A→C, and B→C, with the arrows denoting directionality. In this example, B would not be paired with A to produce B→A because B occurred after A, although such pairings are possible in other implementations. The directional pairings can also be referred to with the notation X,Y or (X,Y), where the event or user action "X" is denoted as preceding the event or user action "Y".

At block 306, one or more metrics are calculated with respect to the pairs of user actions. Data for calculating the metrics can be identified from the logs in the user data repository. This data can include, for example, information regarding timing of user actions, types of user actions performed, and orders (e.g., purchase or rental). The data mined from multiple users' input streams can be aggregated to form metrics for each pair of user actions. These metrics, as well as the aggregation of metrics data, are described in greater detail below with respect to FIG. 4.

Relationship data is stored in a relationship dataset at block 308. This relationship data reflects the one or more metrics and the pair of user actions. The relationship dataset can therefore be viewed as a graph, and in one embodiment, a hit graph that includes relationships between page hits or selections by users. For instance, in the graph context, the metrics can be stored as one or more edge values for each node pair. However, in certain embodiments, the metrics do not reflect any semantics for interpreting the relationship between the paired nodes. Rather, domain-specific applications interpret the meaning of the metrics, as described herein.

FIG. 4 illustrates another embodiment of a relationship mining process 400. The relationship mining process 400 provides further example details regarding aggregation of user data and can be implemented in conjunction with the process 300 described above. The process 400 can be implemented by any of the systems described herein, including the system 100 and 200. For example, the process 400 can be implemented by the pairing engine 120 or 220.

At block 402, activity data representing two (or more) user actions occurring together within a session are paired, for example, according to the relationship mining process 300. Session-level metrics for each user action pair are calculated at block 404. Sessions are used in this example to denote a period of time for gathering data, although other time periods may be used. The session-level metrics can be identified from logs, as described above. The session level metrics in the e-commerce context can include information regarding timing of user actions, orders (e.g., purchase or rental), and types of user actions performed, among others.

Timing of user actions can be determined from time stamps corresponding to each user action. The time stamps can be identified by UNIX/POSIX epochs or by some other timing mechanism. Several metrics regarding time can be measured, including the specific time or time stamp each user action occurred in a pair, the difference between time stamps in a pair, the difference between the time of a user action and an order occurring, and the like.

At the session level, identifying metrics regarding the types of user actions that occurred may also include identifying the category or type of items selected by a user action, the type of page selected by a user action (e.g., forum page versus customer review page), and the like. This data may be found from metadata associated with links in the user logs or the like. Data regarding orders can include information regarding order totals, order quantities, shipping information, and the like. Multiple occurrences of the same user action can be ignored within a given session to prevent or reduce double-counting of user actions.

Session-level metrics are aggregated over a time window to obtain pair-level metrics at block 406. The time window can include several days or sessions, for example. The time window can be a sliding window that is updated each day or session. Aggregating the metrics can include tabulating the values of metrics obtained from multiple users at the session-level, averaging the metrics, and/or the like. For example, the total number of co-view occurrences of a pair of items can be computed by summing the number of users who both viewed two items within the time window. A time difference between paired user actions can be averaged over several users within the time window to produce an average time difference for the pair. This metric might be used as an indication of how related the two items are; as the average time difference decreases, the relevance can increase.

An average Y time can be tabulated by averaging the time stamp that each Y (right) user action occurred in an X,Y pair. This measure can be used to prioritize recency of the Y user actions related to the X user actions. This recency might be used by an application, for instance, to rank an output of the application.

Another metric that can be aggregated at block 406 is an average after Y revenue. This metric can represent the average time between the Y user action and a subsequent order event in a session. One possible use of this metric is to prioritize a given pair's sale conversion likelihood. The smaller the average after Y revenue value, the more representative of how advanced or "far along" a customer is in the order. Similarly, a total after Y quantity metric can be aggregated, which can represent the total units purchased after the Y user action.

Casual browsing of additional items after a purchase are not considered by these "after Y" metrics with respect to that purchase, as these browsing activities are likely not behaviorally related to the purchase. However, additional browsing activities can be accounted for by averaging (or summing) the total session revenue for a plurality of users. The total session revenue metric can be associated with any pair in a session, including pairs having user actions that occurred after any purchase. Likewise, the total quantity of units purchased can be aggregated. Averages of revenue and the quantity of purchased items can also be calculated.

Additional metrics not described in detail herein may also be computed. For example, statistical measures, such as the sum of squares or other metrics to capture the dispersion of a sample distribution, can also be calculated. In general, metrics may be combined to produce new metrics, and statistics can be generated on any metric.

It is determined whether a sufficient data volume has been reached at block 408. If not, the process 400 loops back to block 406, effectively aggregating until a sufficient amount of data is collected. Otherwise, if a sufficient volume of data has been collected, the process 400 ends. Sufficiency of data volume is determined in one embodiment by iterating through sessions in reverse chronological order for a given X,Y pair until a threshold total is reached. The threshold can be an arbitrarily large number. Thus, for high frequency (popular) pairs, this value can effectively cap at least some of their metrics. Low frequency pairs, on the other hand, may account for all or substantially all of the available data in the time window. The downside of capping the high frequency metrics is offset in some embodiments by the built-in measure of recency provided by the cap. A more sophisticated approach such as decaying values with various half-lives is a possible extension but can be computationally costly.

Referring to FIG. 5, an example of data output 500 from a simplified relationship dataset is shown. The data output 500 is in tabular form to illustrate relationships between X and Y pairs 510, 520 and their associated metrics 530, 540. For convenience, a few aggregated metrics 530, 540 are shown. Many more (or fewer) metrics can be stored for a given X,Y pair in an actual implementation.

In the left-most column, X (left) actions are shown. These user actions include such actions as searches (e.g., "search for 'ipod'") and item detail page views. The related Y (right) action is shown in the next column. Thus, for example, the user action "search for 'ipod'" is related to the action "view iPod Shuffle browse page." This relationship may have been made by analyzing data of a plurality of users, employing the techniques described above.

The example metrics 530, 540 for these pairings shown include a co-view count 530 and a time delta 540. The co-view or co-occurrence count 530 represents a number of users that performed both actions within a given session or other time period. The time delta 540 represents the average time distance between selection of the X action 510 and the Y action 520.

While the data output 500 shows user actions in tabular form, data representing these actions may look different in a relationship dataset. For example, the data corresponding to a "search for 'ipod'" may include the search text "ipod" or a URL with a search referrer page including the text "ipod." Many other variations in storing and presenting data from a relationship dataset are possible.

IV. Example Domain-Specific Applications

FIG. 6 illustrates an embodiment of a domain-specific application process 600 that uses the relationship dataset generated above. The process 600 can be implemented by any of the systems described herein, including the system 100 and 200. In particular, the process 600 can be implemented by any of the applications 140, 240. The process 600 illustrates, at a high level, how two different applications might access the same relationship dataset. Examples of such applications are also described.

At block 602, relationship data stored in the relationship dataset is accessed with separate domain-specific applications. Some examples of domain-specific applications have been described above, including search engine optimization applications, recommendation applications, and the like. These applications can perform look-ups of data in the relationship dataset based on certain design criteria for each application. For instance, a search engine optimization application may identify certain user actions that reflect keyword searches and subsequent page selections, whereas a recommendation application might identify user selections of items for purchase and/or viewing.

At block 604, one or more metrics associated with the relationship data are used in a first application to obtain a first outcome. Similarly, at block 606, one or more metrics associated with the relationship data are used in a second application to obtain a second outcome. Outputs from the applications based on the outcomes are provided at block 608. Each application may apply a function, for instance, to the metrics in the relationship dataset. The function can be an objective function that attempts to optimize or rank the pairings in the relationship dataset based on some goal, such as optimization of a search index. The outcomes from applying the function can be different for each application, for example, resulting in different scorings and rankings of pairings. The outputs can be specific to the application and can be outputs to users (such as recommendations) or internal outputs (such as updates to a search index).

To illustrate how a scoring function can be derived as a heuristic of an objective function, the following example is described in the context of search engine optimization. In particular, the following example attempts to solve a keyword to landing page optimization problem, where the best (or estimated best) landing page for a particular keyword is to be chosen. This problem can find application in paid search channels, for instance, where an operator of the electronic catalog system 210 bids on search terms of an external search engine site 206. A goal in solving this problem can be to find the best or optimal landing page or search result for a given search term that was bid on. Another design goal for this scenario can include determining what price to bid based on, for example, projected revenue metrics for a given keyword-landing page pair.

An application centered on increasing conversion (e.g., making online purchases) from keyword searches might score user action pairs based on the following metrics (see FIG. 4 for a more detailed description of the metrics):

"Total Revenue" or "Total After Y Revenue"

The application can focus on pairs that actually occurred before the order events in one embodiment, so that the Total After Y Revenue metric is used instead of total revenue. The current level of user traffic can be taken into account to scale the Total After Y Revenue metric as follows:

"Total Y Revenue"/"Average Y Revenue Time Delta"

where the "Average Y Revenue Time Delta" can refer to an average time difference between the Y event and a purchase (see FIG. 4). As this time difference is larger, the value of the pairing toward conversion is diminished.

This scoring function, however, can suffer from having top sellers' detail pages as the best pairings. Thus, to add a measure of how related the X and Y events are, the following changes can be made to the scoring function:

(1/"Average X,Y Time Delta")*("Total Y Revenue"/
"Average Y Revenue Time Delta")

where the "Average X, Y Time Delta" refers to an average time difference between the X and Y events. As the average difference between the X and Y events is larger, the conversion value is further diminished.

Despite these changes, this revised scoring function has not acknowledged that it deals with averages and therefore can be vulnerable to data sparsity issues. This problem can be remedied by introducing a Total Views metric:

"Total Views"*(1/"Average X Y Time Delta")*("Total
Y Revenue"/"Average Y Revenue Time Delta")

where the "Total Views" represents the total co-occurrence of views of two items in the pair. Some simple algebra later results in:

"Total Views"*"Total Y Revenue"/("Average X Y
Time Delta"*"Average Y Revenue Time Delta")

In certain embodiments, this scoring function, or a variation thereof, can be used to solve the keyword-to-landing page problem.

Other example implementations for domain-specific applications include free search applications. For example, an application can use the relationship dataset to expose on a search results page search terms that are related to a user's current search term. Another application might use the relationship dataset to relate pages in an electronic catalog system that are not typically indexed together, such as browse node (category) pages and author pages (including content produced by authors of books or other items). As will be apparent from this disclosure, many other applications using the same relationship dataset are possible.

V. Conclusion

In summary, in certain embodiments, the relationship analysis system can transform data representing user actions into pairings and metrics representing those pairings. These pairings and metrics can further be transformed by a domain-specific application into scored or ranked results that can be used to output some data representation (e.g., of an item) to a user.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for detecting behavior-based relationships for multiple domain-specific applications, the system comprising:

a pairing engine comprising computer hardware, the pairing engine configured to:
identify a first user action and a second user action with respect to a network application accessible to a plurality of users over a network, the first and second user actions comprising browsing actions both performed by at least one of the users with respect to an electronic catalog provided by the network application,
obtain a metric related to the first and second user actions, the metric reflecting a characteristic related to the first and second user actions but not representing a ranking of a relationship between the first and second user actions, and
pair together activity data reflecting the first and second user actions and store the metric in association with the paired activity data to produce relationship data, the activity data comprising links to documents of the network application accessed by the users;
a search application configured to analyze the metric to calculate a first strength of the relationship between the first and second user actions and to use the first calculated strength to adjust a characteristic of a search engine; and
a recommendation application configured to analyze the metric to calculate a second strength of the relationship and to use the second calculated strength to recommend one or more items to selected users, the second calculated strength differing from the first calculated strength;
wherein said obtaining the metric not representing a strength of the relationship between the first and second user actions enables the search and recommendation applications to independently analyze the relationship data according to different criteria without maintaining separate sets of the relationship data.

2. The system of claim 1, wherein the relationship data is generated into a hit graph.

3. The system of claim 1, wherein the metric comprises a revenue value regarding revenue occurring with respect to the first and second user actions.

4. The system of claim 1, wherein the metric comprises a total count of co-occurrences of the first and second user actions.

5. The system of claim 1, wherein the metric comprises a time difference between occurrences of the first and second user actions.

6. The system of claim 1, wherein the pairing engine, the search application, and the recommendation application are implemented by one or more machines.

* * * * *